(12) United States Patent
Nice et al.

(10) Patent No.: US 8,874,693 B2
(45) Date of Patent: Oct. 28, 2014

(54) SERVICE ACCESS USING A SERVICE ADDRESS

(75) Inventors: Nir Nice, Kfar Vradim (IL); Jeromy S. Statia, Duvall, WA (US); Samer J. Karim, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1249 days.

(21) Appl. No.: 12/389,402

(22) Filed: Feb. 20, 2009

(65) Prior Publication Data

US 2010/0218247 A1 Aug. 26, 2010

(51) Int. Cl.
G06F 15/16 (2006.01)
H04L 29/06 (2006.01)
H04W 12/00 (2009.01)
H04L 29/12 (2006.01)

(52) U.S. Cl.
CPC .......... *H04W 12/00* (2013.01); *H04L 61/2046* (2013.01); *H04L 61/6059* (2013.01); *H04L 63/20* (2013.01); *H04L 69/167* (2013.01); *H04L 61/2084* (2013.01)
USPC .......................... 709/219; 709/220; 370/392

(58) Field of Classification Search
CPC ...................... H04L 61/2046; H04L 29/12264
USPC ........................................................ 709/219
See application file for complete search history.

(56) References Cited

U.S. PATENT DOCUMENTS

| | | | |
|---|---|---|---|
| 6,473,406 B1 * | 10/2002 | Coile et al. | 370/248 |
| 7,305,481 B2 | 12/2007 | Blanchet et al. | |
| 7,443,880 B2 | 10/2008 | Wetterwald et al. | |
| 7,734,745 B2 | 6/2010 | Gloe | |
| 2002/0136226 A1 * | 9/2002 | Christoffel et al. | 370/401 |
| 2002/0161899 A1 * | 10/2002 | Yamaguchi et al. | 709/227 |
| 2003/0227930 A1 * | 12/2003 | Choi et al. | 370/401 |
| 2004/0083306 A1 | 4/2004 | Gloe | |
| 2004/0100976 A1 * | 5/2004 | Chang et al. | 370/401 |
| 2004/0215687 A1 * | 10/2004 | Klemba et al. | 709/200 |
| 2005/0030956 A1 * | 2/2005 | Lord et al. | 370/401 |
| 2005/0030959 A1 * | 2/2005 | Kunze et al. | 370/401 |
| 2005/0066035 A1 * | 3/2005 | Williams et al. | 709/226 |
| 2005/0086524 A1 * | 4/2005 | Cavanaugh | 713/201 |
| 2005/0176413 A1 * | 8/2005 | Lee et al. | 455/414.1 |
| 2006/0029064 A1 * | 2/2006 | Rao et al. | 370/389 |
| 2006/0034296 A1 * | 2/2006 | Talucci | 370/395.52 |
| 2006/0104226 A1 | 5/2006 | Ahn | |

(Continued)

FOREIGN PATENT DOCUMENTS

| | | |
|---|---|---|
| CN | 1499396 A | 5/2004 |
| JP | 200915520 A | 1/2009 |
| WO | 2005025170 A1 | 3/2005 |

OTHER PUBLICATIONS

Managing Serviceguard Fourteenth edition, published Jun. 2007.*

(Continued)

*Primary Examiner* — Hamza Algibhah
(74) *Attorney, Agent, or Firm* — Ben Tabor; Kate Drakos; Micky Minhas

(57) ABSTRACT

A method is disclosed that includes assigning a service address to a service of a private network. The service of the private network is accessible, via a gateway, by a client computer. The method also includes turning off duplicate address detection at the gateway. The gateway is associated with a public network address that is different from the service address.

20 Claims, 8 Drawing Sheets

(56) References Cited

U.S. PATENT DOCUMENTS

| | | | |
|---|---|---|---|
| 2006/0159100 A1 | 7/2006 | Droms et al. | |
| 2006/0195888 A1* | 8/2006 | Kalonji et al. | 726/4 |
| 2006/0215657 A1 | 9/2006 | Lee et al. | |
| 2006/0221987 A1* | 10/2006 | Polson | 370/402 |
| 2006/0280189 A1* | 12/2006 | McRae et al. | 370/401 |
| 2007/0058644 A1* | 3/2007 | Brahmbhatt et al. | 370/401 |
| 2007/0104169 A1* | 5/2007 | Polson | 370/338 |
| 2007/0258470 A1* | 11/2007 | Daloz et al. | 370/401 |
| 2007/0294226 A1* | 12/2007 | Chahal et al. | 707/3 |
| 2008/0082642 A1* | 4/2008 | Wu | 709/222 |
| 2008/0101357 A1* | 5/2008 | Iovanna et al. | 370/389 |
| 2008/0123640 A1 | 5/2008 | Bhatia et al. | |
| 2008/0133710 A1* | 6/2008 | Suzuki et al. | 709/218 |
| 2008/0133774 A1* | 6/2008 | Rhee | 709/246 |
| 2008/0134339 A1 | 6/2008 | Kim et al. | |
| 2008/0147871 A1 | 6/2008 | Le Pennec et al. | |
| 2008/0177869 A1* | 7/2008 | Read | 709/220 |
| 2008/0189436 A1 | 8/2008 | Vaswani et al. | |
| 2009/0013065 A1 | 1/2009 | Nagashima | |
| 2009/0097458 A1* | 4/2009 | Wu et al. | 370/338 |
| 2009/0097491 A1* | 4/2009 | Suginaka et al. | 370/401 |
| 2009/0113539 A1* | 4/2009 | Shu et al. | 726/12 |
| 2009/0129301 A1* | 5/2009 | Belimpasakis | 370/310 |
| 2010/0125902 A1* | 5/2010 | Killian et al. | 726/15 |
| 2010/0296647 A1* | 11/2010 | Chan | 379/413.02 |
| 2011/0026700 A1* | 2/2011 | Clark et al. | 379/142.15 |
| 2011/0209000 A1* | 8/2011 | Hamman et al. | 714/24 |
| 2011/0246629 A1* | 10/2011 | Savolainen et al. | 709/220 |
| 2011/0255541 A1* | 10/2011 | Poscher | 370/392 |
| 2011/0286384 A1* | 11/2011 | Sugimoto et al. | 370/328 |

OTHER PUBLICATIONS

Das Kaushik, "IPv6 Transition Technologies", retrieved at <<http://www.ipv6.com/articles/gateways/IPv6-Tunnelling.htm >>, Dec. 4, 2008, pp. 1-2.

Guardini et al, "IPv6 Transition Mechanisms", retrieved at <<http://www.ngnet.it/e/trans/index.php>>, Dec. 4, 2008, pp. 1-3.

"IPv6 Transition Guidance", retrieved at <<www.cio.gov/documents/IPv6_Transition_Guidance.doc >>, Federal CIO Council Architecture and Infrastructure Committee, Feb. 2006, pp. 1-37.

"International Search Report", Mailed Date: Jun. 28, 2010, Application No. PCT/US2010/021891, Filed Date: Jan. 22, 2010, pp. 11.

Notice on the First Office Action received from the State Intellectual Property Office of the Peoples's Republic of China, dated Mar. 5, 2013, with English translation, 14 pages.

Notice on the Second Office Action received from the State Intellectual Property Office of the Peoples's Republic of China, dated Sep. 29, 2013, with English translation, 12 pages.

Notice on the First Office Action received from the Japanese Patent Office, dated Oct. 28, 2013, with English translation, 8 pages.

"Supplementary European Search Report"; mailed Dec. 13, 2013; Application No. PCT2010021891; 10 pages.

Microsoft Corporation; "Technical Overview of DirectAccess in Windows 7 and Windows Server 2008 R2"; Jan. 2009; XP055091624; retrieved on Dec. 4, 2013 from https://web.archive.org/web/20100131164609/http://audio.federalnewsradio.com/temp/Technical_Overview_of_DirectAccess.pdf; 14 pages.

Nadas et al.; "Virtual Router Redundancy Protocol Version 3 for IPv4 and IPv6; draft-ietf-vrrp-unified-spec-02.txt"; Internet Engineering Task Force, ITEF; Standardworkingdraft, Internet Society (ISOC) 4, Rue Des Falaises Ch- n1205 Geneva Switzerland; vol. vrrp, np. 2; Apr. 15, 2008; 44 pages.

Janne Ostling; "IPv6 for Dummies", Internetdagarna 2008; Oct. 21, 2008; pp. 1-174; XP055088912' Stockholm, Sweden.

Graveman R et al. "Using IPsec to Secure IPv6-in-IPv4 Tunnels"; 4891.txt; May 1, 2007; XP015052431; 24 pages.

Eronen, P. et al.; "IPv6 Configuration in IKEv2", Network Working Group, Nov. 18, 2009; 36 pages.

Bahrat Suneja; "Exchangepedia: Windows 7 and Direct Access; The Anywhere Experience"; Exchangepedia Blog; Jan. 24, 2009; XP055091985; retrieved on Dec. 6, 2013 from http://exchangepedia.com/blog/2009/06/windows-7-and-direct-access-anywhere.html; 8 pages.

* cited by examiner

SERVICE ACCESS USING A SERVICE ADDRESS

BACKGROUND

A service of a private network (e.g., a corporate network) may be accessed by a client computer via one or more service end-points. Typically, when the client computer roams, the client computer connects to the network via different entry points, each associated with a different service end-point. Each service end-point may be associated with a different service end-point address. Some services (e.g., Internet Protocol Security (IPSec) Tunnel mode service and a Domain Name Service (DNS)) may involve service end-point configuration on a client computer. Typically, when the client computer moves from a location associated with a first service end-point to a location associated with a second service end-point, the service end-point address is reconfigured at the client computer.

SUMMARY

The present disclosure relates to remote access to a service of a private network (e.g., a corporate network) via a gateway. By assigning a common service address to each service end-point (e.g., gateway) and disabling duplicate address detection, reconfiguration of a client computer when roaming between different service end-points may be avoided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method is disclosed that includes assigning a service address to a service of a private network. The service of the private network is accessible by a client computer, via a gateway. The method includes turning off duplicate address detection at the gateway. The gateway is associated with a public network address that is different from the service address.

In another particular embodiment, a computer-readable storage medium is disclosed. The computer-readable storage medium includes instructions, that when executed by a processor at a gateway, cause the processor to assign a service address to a service of a private network. The service of the private network is accessible, via the gateway, by a client computer. The computer-readable storage medium also includes instructions, that when executed by the processor at the gateway, cause the processor to turn off duplicate address detection at the gateway. The gateway has an associated public network address that is different from the service address.

In another particular embodiment, a method is disclosed that includes accessing a service at a first time via a first gateway. The first gateway is associated with a first Internet Protocol (IP) address. Duplicate address detection is turned off at the first gateway. The method includes accessing the service at a second time via a second gateway. The second gateway is associated with a second IP address. Duplicate address detection is also turned off at the second gateway. The service is accessed at the first gateway and at the second gateway using a common service address. The common service address is different from the first IP address and the second IP address.

Figure 1:
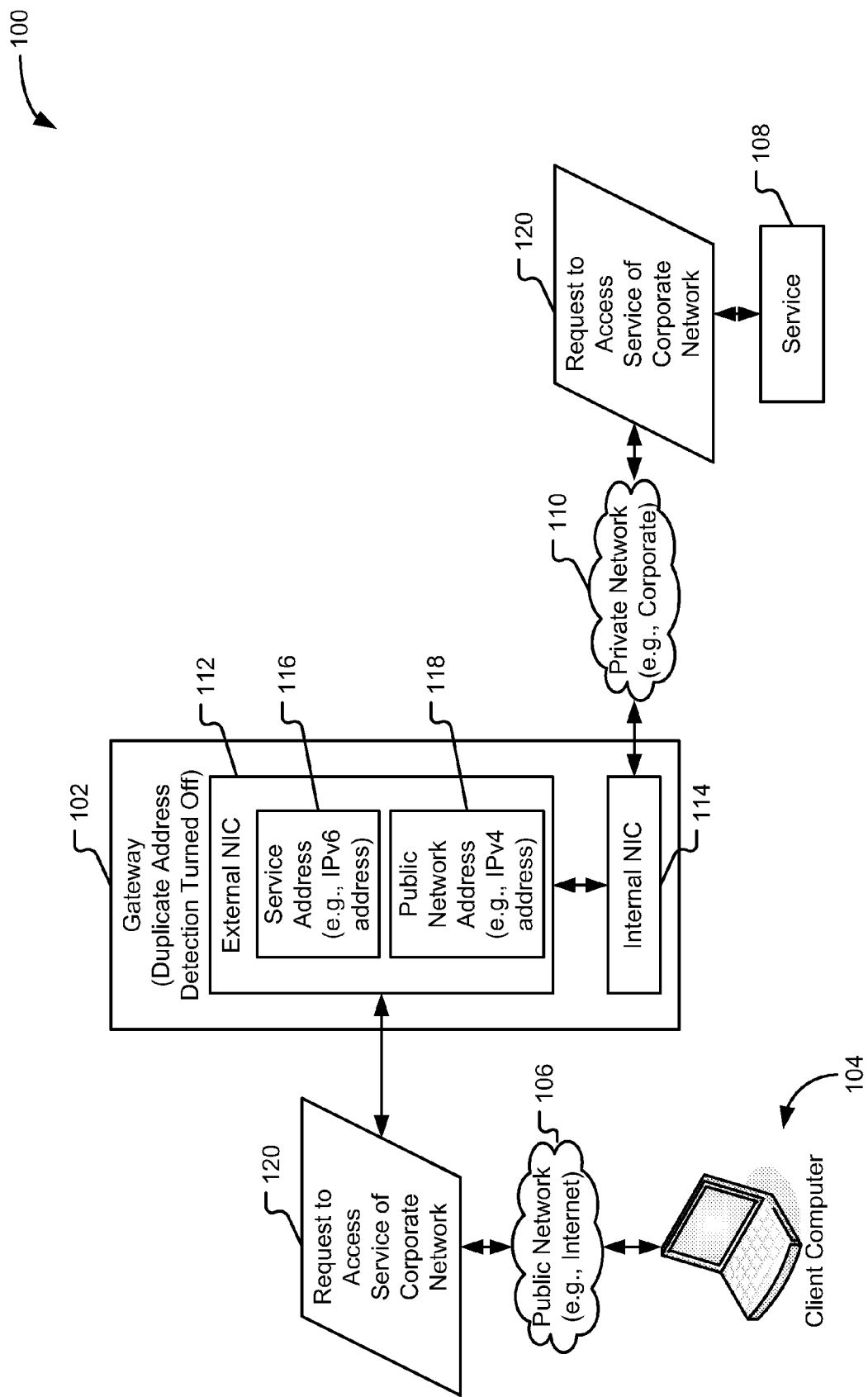
FIG. 1 is a block diagram that illustrates a first embodiment of a service access system.

Referring to FIG. 1, a block diagram of a first embodiment of a service access system is illustrated and generally designated 100. The system 100 includes a gateway 102 in communication with a client computer 104 via a public network (e.g., the Internet) 106 and in communication with a service 108 of a private network (e.g., a corporate network) 110. In a particular embodiment, the client computer 104 includes a portable laptop computer. Alternatively, the client computer 104 may include any device that can access the public network 106 (e.g., a smart phone or a personal digital assistant).

The gateway 102 is operable to assign a service address 116 to the service 108. In a particular embodiment, the gateway stores the assigned service address 116 in memory. For example, the memory may include dynamic memory storage, such as a random access memory (RAM) storage device, or a non-volatile memory storage device.

The gateway 102 is further operable to turn off duplicate address detection at the gateway 102. Duplicate address detection (DAD) is a feature of the Internet Protocol version six (IPv6) networking stack. The DAD feature may be used to verify that a new unicast IPv6 address is not duplicated on the network. However, in the present disclosure, a common service address (e.g., the service address 116) may be assigned to gateways other than the gateway 102 illustrated in FIG. 1. Therefore, duplicate address detection is disabled at the gateway 102. In a particular embodiment, duplicate address detection may be disabled at the gateway 102 by modifying a kernel parameter. For example, a configuration file with the kernel parameter may be modified. Alternatively, an operating system at the gateway 102 may initiate a command to disable the duplicate address detection feature.

The gateway 102 is accessible at a public network address 118 that is different from the service address 116. In order to access the service address 116, the client computer 104 connects to the gateway 102 via the public network address 118. The gateway 102 is operable to receive a request 120 to access the service 108 of the private network 110 from one or more client computers (e.g., the client computer 104) via the public network 106.

In the embodiment illustrated in FIG. 1, the gateway 102 includes an external network interface card (NIC) 112 and an internal NIC 114. The external NIC 112 is coupled to the public network 106, and the internal NIC 114 is coupled to the private network 110. The service address 116 and the public network address 118 are assigned to the external NIC 112. In the particular embodiment illustrated in FIG. 1, the public network address 118 is an IP version four (IPv4) address, and the service address 116 is an IP version six (IPv6) address.

The different address types (e.g., the IPv4 address type and the IPv6 address type) allow two different IP addresses to be assigned to the same interface (e.g., the external NIC 112).

Communications between the client computer 104 and the gateway 102 may be in an IPv6 transition technology protocol format. In a particular embodiment, the client computer 104 communicates with the gateway 102 using an IPv6 transition technology protocol, the service address 116 includes an IPv6 address assigned to the external NIC 112 of the gateway 102, and the request 120 is directed to the IPv6 address assigned to the external NIC 112 of the gateway 102. Alternatively, the client computer 104 may communicate with the gateway 102 using IPv4 protocol. In a particular embodiment, the client computer 104 communicates with the gateway 102 using IPv4 protocol, and the service address 116 is assigned to a virtual network interface card (NIC) of the gateway 102 (not shown). In another particular embodiment, the client computer 104 communicates with the gateway 102 using IPv4 protocol, and a virtual private network (VPN) connection is established between the client computer 104 and the gateway 102.

In operation, the request 120 to access the service 108 of the private network 110 is received at the gateway 102 from the client computer 104. In a particular embodiment, the request 120 includes a data packet that contains the service address 116 (e.g., the service address 116 may be in a packet header or a packet payload of the request 120). The request 120 is received from the public network 106 at the external NIC 112 of the gateway 102. The request 120 is routed from the gateway 102 to the private network 110 via the internal NIC 114. Thus, the client computer 104 accesses the service 108 via an IP address (e.g., the service address 116) that is different from the public network address 118 associated with the gateway 102. The service 108 may include an Internet Protocol Security (IPSec) tunnel mode service, a domain name service (DNS), or a forward proxy service, among other alternatives. Because the service 108 is accessible via a common service address, such as the service address 116, reconfiguration of the client computer 104 is not needed when the client computer 104 changes locations.

Thus, the service address 116 represents a "phantom" IP interface on the gateway 102 that is different from an internal address of the gateway 102 and an external address of the gateway 102. Because the service address 116 may be assigned to multiple gateways, duplicate address detection is disabled in order to prevent errors. Proper forward routing is set at the gateway 102 so that all traffic from the external NIC 112 destined for the internal NIC 114 is forwarded to the service address 116 instead of directly to the internal NIC 114. Similarly, traffic from the internal NIC 114 that is destined for the external NIC 112 is forwarded to the service address 116, instead of directly to the external NIC 112. In a particular embodiment, two "phantom" interfaces may be defined at the gateway 102 (one facing the external address and one facing the internal address). The relevant services (e.g., the service 108) are defined to use the service address 116 as service end-points. Routing to the service address 116 may be handled by reference to the internal address or the external address. For example, a VPN connection may connect to the external address and becomes a default route for all traffic.

The present disclosure is applicable to both IPv6 and IPv4. For example, in the case of IPv6, IPv6 transition technologies may be used to interface with an external IPv4 address, and the service address 116 may be defined to have an IPv6 address. As another example, in the case of IPv4, a VPN connection to the external NIC 112 of the gateway 102 may be used to provide similar functionality.

In the case of IPv4, the service end-point address is typically configured during address assignment of VPN establishment (similar to DNS configuration). By contrast, in the case of IPv6, the service end-point address is a global address and is not assigned. However, the disclosed system may also be used in cases where the service end-point address is not assigned during VPN establishment.

Figure 2:
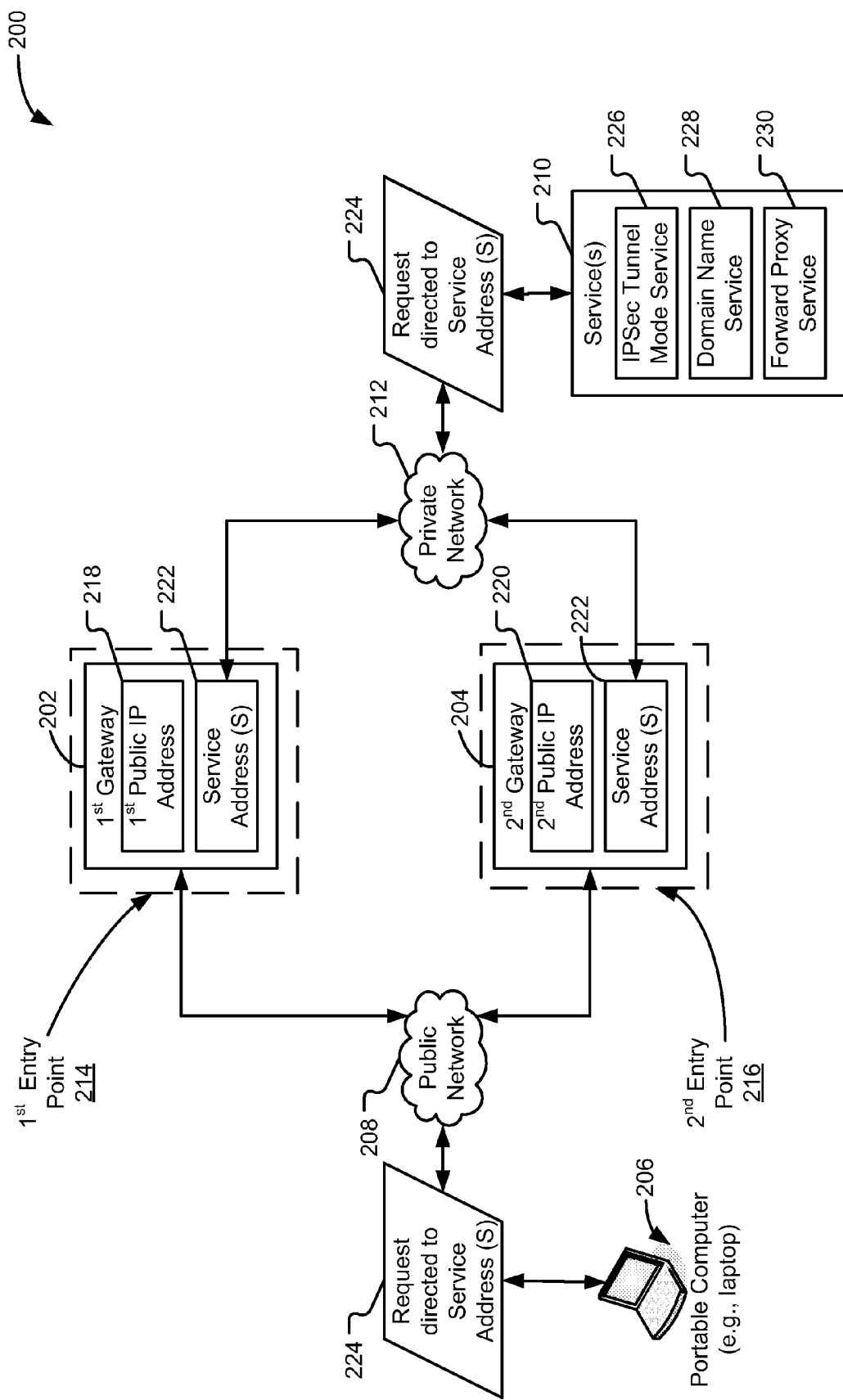
FIG. 2 is a block diagram that illustrates a second embodiment of a service access system.

Referring to FIG. 2, a second embodiment of a service access system is illustrated and generally designated 200. In the particular embodiment illustrated in FIG. 2, the system 200 includes a first gateway 202 and a second gateway 204. Both the first gateway 202 and the second gateway 204 are in communication with a portable computer 206 (e.g., a laptop computer or any other portable computing device) via a public network (e.g., the Internet) 208 and in communication with at least one service 210 of a private network (e.g., a corporate network) 212. In a particular embodiment, the portable computer 206 is the client computer 104 of FIG. 1. In the particular embodiment illustrated in FIG. 2, the first gateway 202 is associated with a first entry point 214, and the second gateway 204 is associated with a second entry point 216. Multiple entry points may allow the service 210 of the private network 212 to be accessed by the portable computer 206 from various locations.

In the particular embodiment of FIG. 2, the first gateway 202 is associated with a first public Internet Protocol (IP) address 218, and the second gateway 204 is associated with a second public IP address 220. A service address 222 is associated with both the first gateway 202 and the second gateway 204. The service address 222 is different from the first public IP address 218 of the first gateway 202, and the service address 222 is different from the second public IP address 224 of the second gateway 204. Duplicate address detection is turned off at both gateways 202 and 204, because a common address (e.g., the service address 222) is assigned to both of the gateways 202 and 204. The service 210 of the private network 212 may be accessed by the portable computer 206 by use of the service address 222.

The first gateway 202 may be connected to the public network 208 via a first external network interface card (NIC). Similarly, the second gateway 204 may be connected to the public network 208 via a second external NIC. In a particular embodiment, the service address 222 includes an IPv6 address, and the IPv6 address is assigned to the first external NIC of the first gateway 202 and to the second external NIC of the second gateway 204.

In operation, the portable computer 206 sends a request 224 directed to the service address 222 in order to access the service 210 of the private network 212. For example, the service 210 may include an Internet Protocol Security (IPSec) tunnel mode service 226, a domain name service (DNS) 228, or a forward proxy service 230, among other alternatives. When the request 224 is received at the first gateway 202, the request 224 is routed from the first gateway 202 to the private network 212. Similarly, when the request 224 is received at the second gateway 204, the request 224 is routed to the private network 212. Thus, the service address 222 enables the service 210 of the private network 212 to be accessed via a common IP address, regardless of entry point.

For example, when the portable computer 206 seeks access to the IPSec Tunnel Mode Service 226, the IPSec Tunnel Mode Service 226 may be provided via the first gateway 202 at the first entry point 214 or via the second gateway 204 at the second entry point 216 using the same IP address (e.g., the service address 222). Similarly, when the portable computer 206 seeks access to the domain name service (DNS) 228 or the forward proxy service 230, the services 228 and 230 may be provided via the first gateway 202 at the first entry point 214 or via the second gateway 204 at the second entry point 216 using the same IP address (e.g., the service address 222). Using the same IP address allows the portable computer 206 to roam without client service end-point reconfiguration.

In a particular illustrative embodiment, the portable computer 206 uses IPv6 transition technology protocol to connect to the first gateway 202. For example, the IPv6 transition technology protocol may include Teredo or 6to4, among other alternatives. The portable computer 206 uses IPSec Tunnel mode to secure traffic between the portable computer 206 and the first gateway 202. The private network 212 may be an IPv6 network. The service address 222 is defined on the portable computer 206 as the IPSec Tunnel endpoint (as the DNS server IP address). Routing is set on the portable computer 206 to route traffic to the service address 222 via the IPv6 transition technology protocol. Forwarding rules are defined on the first gateway 202 to forward traffic from the public IPv4 network interface card (e.g., the external NIC) to the service address 222. The service 210 (e.g., the IPSec Tunnel Mode Service 226 or DNS 228) monitors for the service address 222 and receives traffic from the portable computer 206. Since the service address 222 is used on both the first gateway 202 and the second gateway 204, reconfiguration of the portable computer 206 may be avoided when the portable computer changes gateways. The service 210 sends data toward the private network 212 using an IPv6 address associated with the particular gateway. For example, the service 210 may send data toward the first gateway 202 using a first IPv6 address associated with the first gateway 202 and may send data toward the second gateway 204 using a second IPv6 address associated with the second gateway 204.

A server (not shown) on the private network 212 may determine an appropriate gateway for communications based on routing logic or by replying to a previous connection from the service 210 originating from a specific IPv6 address, among other alternatives. The service 210 receives data from the server on the internal IPv6 NIC and forwards data to the portable computer 206 from the service address 222. Proper forwarding rules are defined on each of the gateways 202 and 204 to forward any traffic from the service address 222 to the external IPv4 NIC using IPv6 transition technologies.

Figure 3:
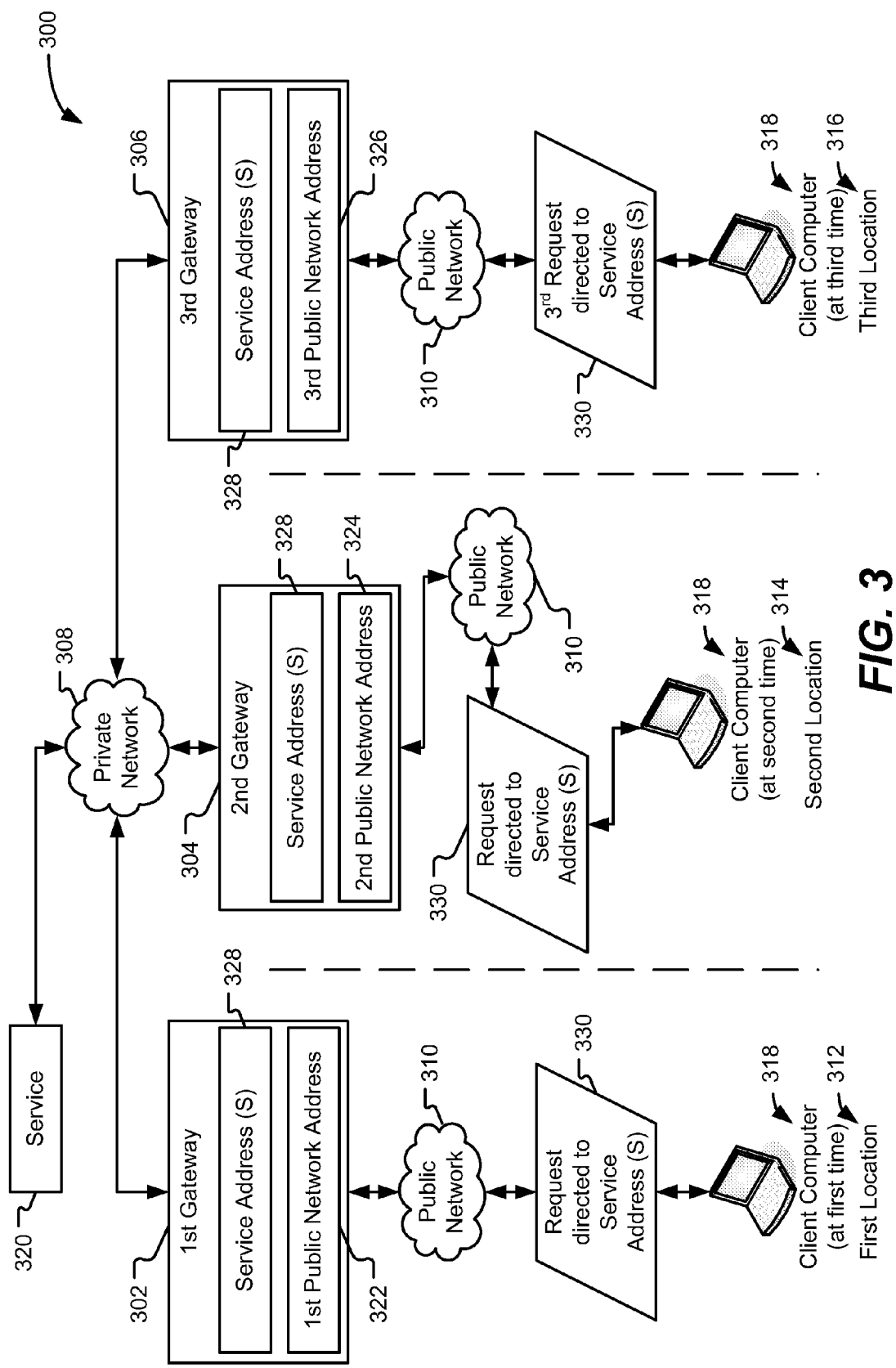
FIG. 3 is a block diagram that illustrates a third embodiment of a service access system.

Referring to FIG. 3, a third embodiment of a service access system is illustrated and generally designated 300. In the particular embodiment illustrated in FIG. 3, the system 300 includes a first gateway 302, a second gateway 304, and a third gateway 306. In alternative embodiments, the system 300 may include any number of gateways at various locations. Each of the gateways 302, 304, and 306 is in communication with a private network 308 and the public network 310. In the particular embodiment illustrated in FIG. 3, the first gateway 302 is associated with a first location 312, the second gateway 304 is associated with a second location 314, and the third gateway 306 is associated with a third location 316. A client computer 318 seeks access to a service 320 of the private network 308 via one of the gateways 302, 304, and 306. The client computer 318 may access the service 320 when roaming between the locations 312, 314, and 316 without adjusting a client configuration (e.g., modifying a service end-point information at the client computer 318).

In the particular embodiment of FIG. 3, the first gateway 302 is associated with a first public network address 322, the second gateway 304 is associated with a second public network address 324, and the third gateway 306 is associated with a third public network address 326. A service address 328 is a common address that is associated with the first gateway 302, the second gateway 304, and the third gateway 306. The service address 328 is different from the first public network address 322, the second public network address 324, and the third public network address 326. Duplicate address detection is turned off at each of the gateways 302, 304, and 306, because a common network address (e.g., the service address 328) is assigned to each of the gateways 302, 304, and 306. The common service address 328 allows the client computer 318 to access the service 320 when roaming and when accessing the private network 308 via different gateway entry points without adjusting a client configuration.

In operation, the client computer 318 sends a request 330 directed to the service address 328 in order to access the service 320 of the private network 308. When the client computer 318 is located at the first location 312, the first gateway 302 responds to the request 330 and routes the request 330 to the private network 308. When the client computer 318 is located at the second location 314, the second gateway 304 responds to the request 330 and routes the request 330 to the private network 308. When the client computer 318 is located at the third location 316, the third gateway 306 responds to the request 330 and routes the request 330 to the private network 308.

In a particular embodiment, the client computer 318 accesses the service 320 at a first time via the first gateway 302. Similarly, the client computer 318 may access the service 320 at a second time via the second gateway 302 and at a third time via the third gateway. For example, the client computer 318 may be located at the first location 312 at the first time, and the client computer 318 may access the service 320 via the first gateway 302 using the service address 328. The client computer 318 may roam from the first location 312 to the second location 314 between the first time and the second time. At the second time, the client computer 318 may access the service 320 via the second gateway 304 using the common service address 328 without modifying service configuration information (e.g., service end-point information) between the first time and the second time. Similarly, at a third time, the client computer 318 may be located at the third location 316. At the third time, the client computer 318 may access the service 320 via the third gateway 306 using the common service address 328 without modifications to the service configuration information.

Figure 4:
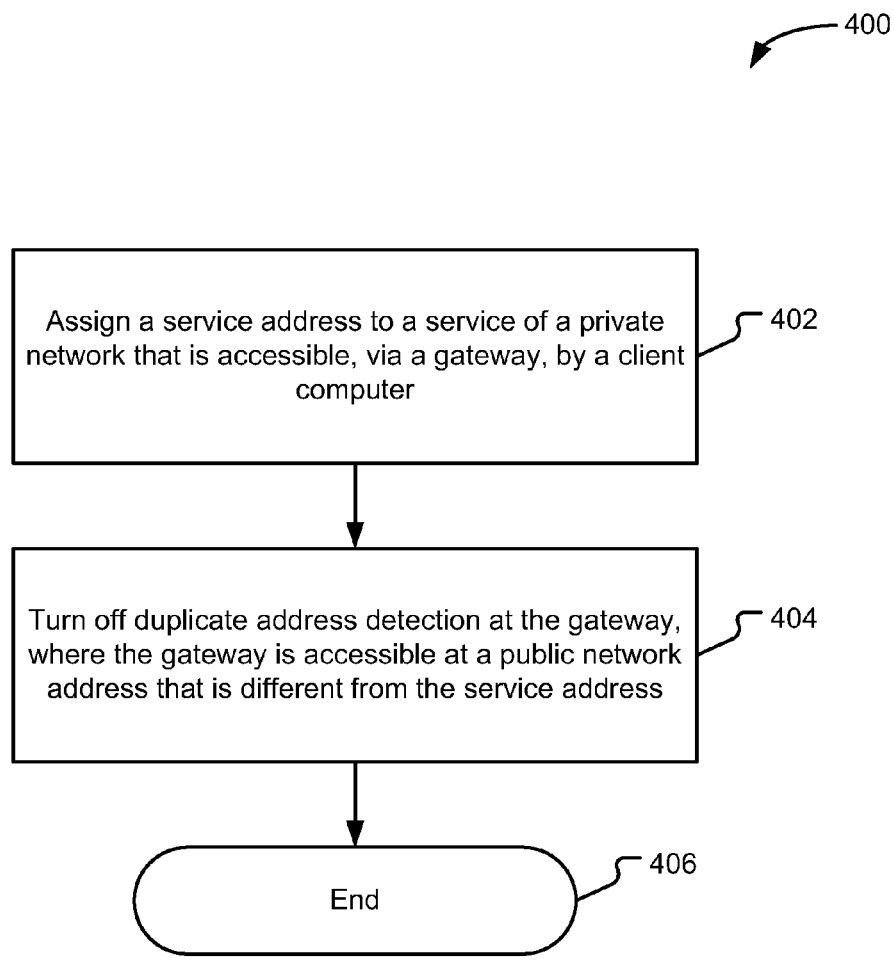
FIG. 4 is a flow diagram that illustrates a first embodiment of a service access method.

Referring to FIG. 4, a first embodiment of a service access method is illustrated and generally designated 400. The method 400 includes assigning a service address to a service of a private network that is accessible, via a gateway, by a client computer, at 402. For example, in FIG. 1, the service address 116 may be assigned to the service 108 of the private network 110, where the service 108 is accessible by the client computer 104 via the gateway 102.

The method 400 includes turning off duplicate address detection at the gateway, at 404. The gateway is accessible by remote computers or other devices by use of a public network address that is different from the service address. For example, in FIG. 1, duplicate address detection may be turned off at the gateway 102. The gateway 102 is accessible by the client computer 104 (remotely connected to the gateway 102 via the public network 106) by used of the public network address 118 that is different from the service address 116. The method 400 ends, at 406.

A common service address allows remote computers or other devices to access a service of a private network when roaming and when accessing the private network via different gateway entry points without adjusting a client configuration.

By avoiding the adjustment of the client configuration, the service of the private network may be accessed more easily by a remote user.

Figure 5:
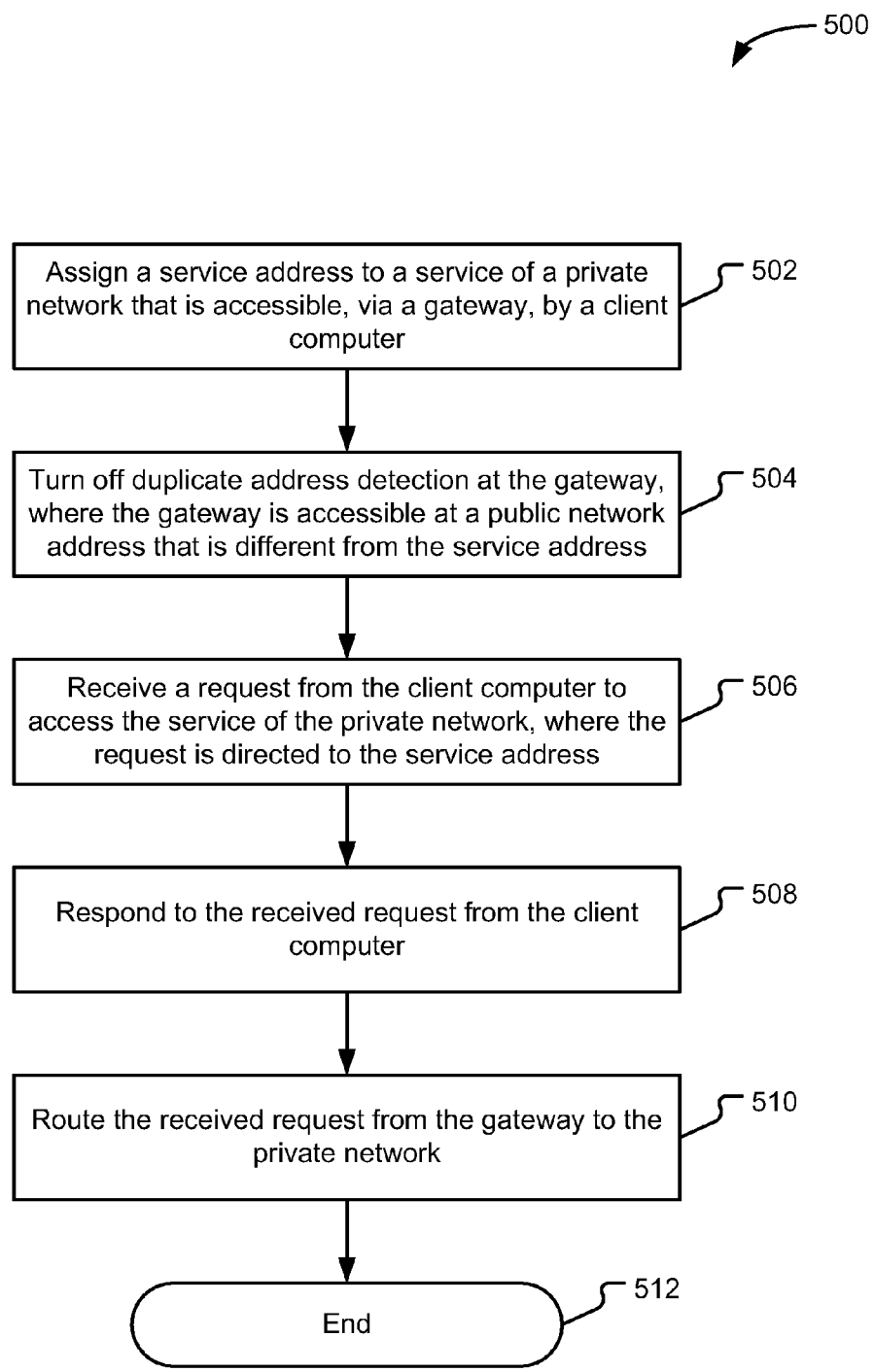
FIG. 5 is a flow diagram that illustrates a second embodiment of a service access method.

Referring to FIG. 5, a second embodiment of a service access method is illustrated and generally designated 500. In a particular embodiment, the method 500 may be implemented using a computer-readable storage medium including instructions, that when executed by a processor at a gateway, cause the processor to perform the method 500.

The method 500 includes assigning a service address to a service of a private network that is accessible, via a gateway, by a client computer, at 502. For example, in FIG. 1, the service address 116 is assigned to the service 108 of the private network 110. The service 108 is accessible, via the gateway 102, by the client computer 104.

Moving to 504, the method 500 includes turning off duplicate address detection at the gateway. For example, in FIG. 1, duplicate address detection may be turned off at the gateway 102. The gateway is accessible at a public network address that is different from the service address. For example, in FIG. 1, the gateway 102 is accessible at the public network address 118 that is different from the service address 116. The method 500 includes receiving a request from the client computer to access the service of the private network at the gateway, at 506. For example, in FIG. 1, the request 120 is received from the client computer 104 to access the service 108 of the private network 110 at the gateway 102. The request is directed to the service address. For example, in FIG. 1, the request 120 is directed to the service address 116.

Proceeding to 508, the method 500 includes responding to the received request from the client computer. The method 500 includes routing the request from the gateway to the private network, at 510. For example, in FIG. 1, the gateway 102 responds to the request 120 from the client computer 104 and routes the request 120 from the gateway 102 to the private network 110. The method 500 ends, at 512

Figure 6:
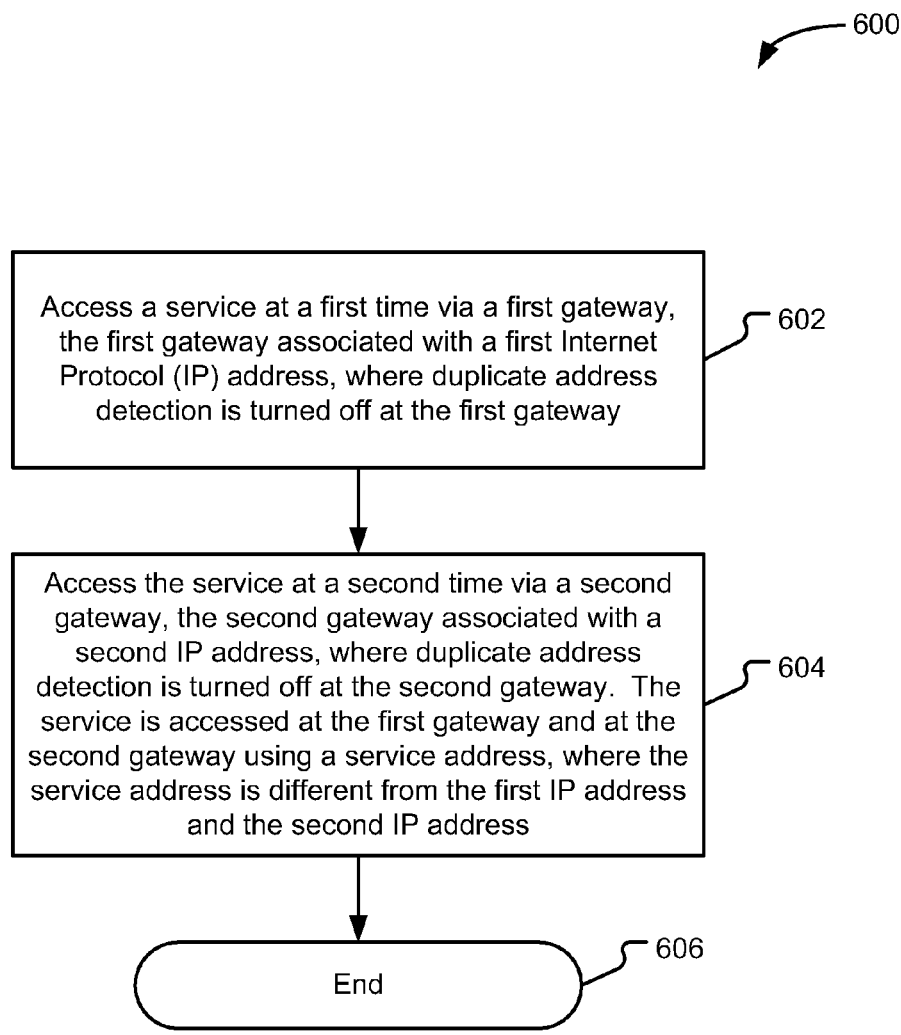
FIG. 6 is a flow diagram that illustrates a third embodiment of a service access method.

Referring to FIG. 6, a third embodiment of a service access method is illustrated and generally designated 600. The method 600 includes accessing a service at a first time via a first gateway, at 602. The first gateway is associated with a first IP address, where duplicate address detection is turned off at the first gateway. For example, in FIG. 3, the client computer 318 accesses the service 320 at the first time via the first gateway 302. Duplicate address detection is turned off at the first gateway 302.

Moving to 604, the method 600 includes accessing the service at a second time via a second gateway. For example, in FIG. 3, the client computer 318 accesses the service 320 at the second time via the second gateway 304. The second gateway is associated with a second IP address, where duplicate address detection is turned off. The service is accessed at the first gateway and at the second gateway using a service address, where the service address is different from the first IP address and the second IP address. For example, in FIG. 3, the second gateway 304 is associated with the second public network address 324. The service 320 is accessed at the first gateway 302 and at the second gateway 304 using the service address 328. The service address 328 is different from the first public network address 322 of the first gateway 302 and is different from the second public network address 324 of the second gateway 304. The method 600 ends, at 606.

Figure 7:
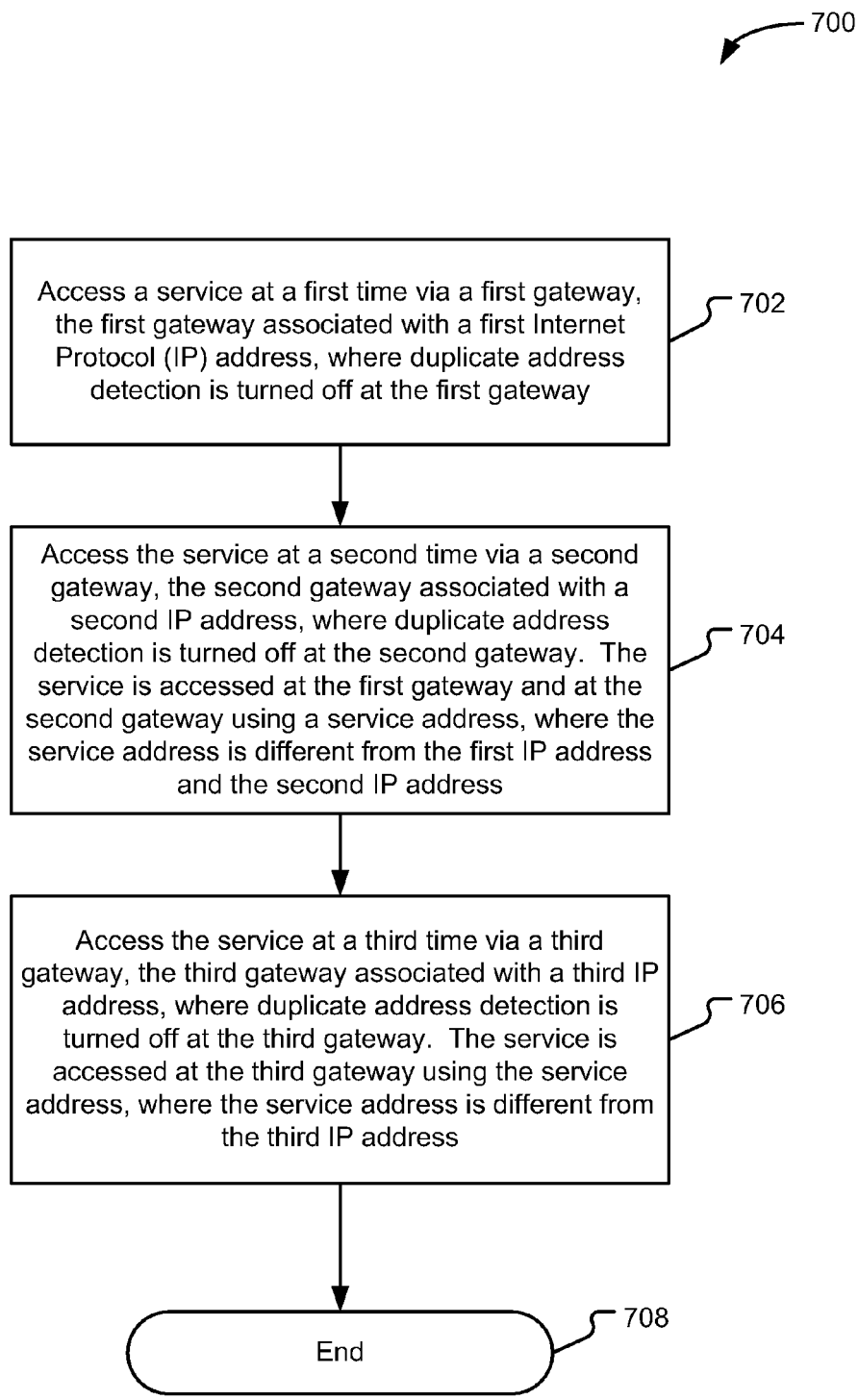
FIG. 7 is a flow diagram that illustrates a fourth embodiment of a service access method.

Referring to FIG. 7, a third embodiment of a service access method is illustrated and generally designated 700. The method 700 includes accessing a service at a first time via a first gateway, at 702. The first gateway is associated with a first IP address and duplicate address detection is turned off at the first gateway. For example, in FIG. 3, the client computer 318 accesses the service 320 at the first time via the first gateway 302. Duplicate address detection is turned off at the first gateway 302.

Moving to 704, the method includes accessing the service at a second time via a second gateway. In a particular embodiment, the service 320 is accessed via a portable computer (e.g., the client computer 318) using the service address 328 without modifying service configuration information at the portable computer between the first time and the second time. The second gateway is associated with a second IP address and duplicate address detection is turned off at the second gateway. The service is accessed at the first gateway and at the second gateway using a service address. The service address is different from the first IP address and the second IP address. For example, in FIG. 3, the client computer 318 accesses the service 320 at the second time via the second gateway 304. The second gateway 304 is associated with the second public network address 324, and duplicate address detection is turned off at the second gateway 304. The service 320 is accessed at the first gateway 302 and at the second gateway 304 using the service address 328. The service address 328 is different from the first public network address 322 of the first gateway 302 and is different from the second public network address 324 of the second gateway 304.

In the particular embodiment illustrated in FIG. 7, the method 700 proceeds to 706, where the method 700 includes accessing the service at a third time via a third gateway. The third gateway is associated with a third IP address, and duplicate address detection is turned off at the third gateway. The service is accessed at the third gateway using the service address. The service address is different from the third IP address. For example, in FIG. 3, the client computer 318 accesses the service 320 at the third time via the third gateway 306. Duplicate address detection is turned off at the third gateway 306. The service 320 is accessed at the third gateway 306 using the service address 328. The service address 328 is different from the third public network address 326 of the third gateway 306. The method 700 ends at 708.

Figure 8:
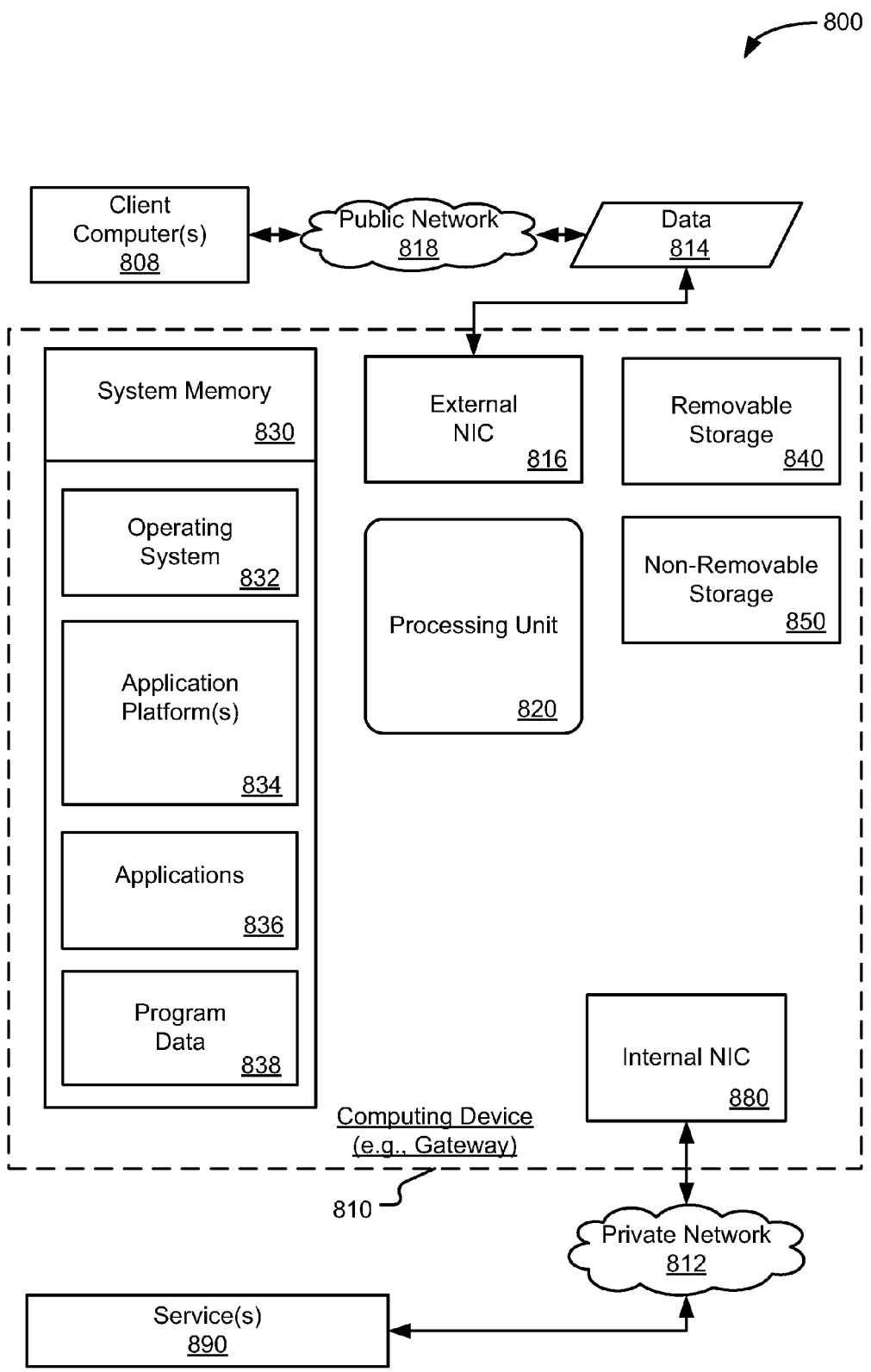
FIG. 8 is a block diagram of an illustrative embodiment of a general purpose computing system.

FIG. 8 shows a block diagram of a computing environment 800 including a computing device 810 operable to support embodiments of computer-implemented methods and computer program products according to the present disclosure. In a basic configuration, the computing device 810 may include a gateway configured to process transactions such as described with reference to FIGS. 1-7.

The computing device 810 typically includes at least one processing unit 820 and system memory 830. Depending on the configuration and type of computing device, the system memory 830 may be volatile (such as random access memory or "RAM"), non-volatile (such as read-only memory or "ROM," flash memory, and similar memory devices that maintain the data they store even when power is not provided) or some combination of the two. The system memory 830 typically includes an operating system 832, one or more application platforms, one or more applications 836, and may include program data 838.

The computing device 810 may also have additional features or functionality. For example, the computing device 810 may also include removable and/or non-removable additional data storage devices such as magnetic disks, optical disks, tape, and standard-sized or miniature flash memory cards. Such additional storage is illustrated in FIG. 8 by removable storage 840 and non-removable storage 850. Computer storage media may include volatile and/or non-volatile storage and removable and/or non-removable media implemented in any method or technology for storage of information such as computer-readable instructions, data structures, program components or other data. The system memory 830, the removable storage 840 and the non-removable storage 850 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store information and which can be accessed by computing device 810. Any such computer storage media may be part of the computing device 810. In a particular embodiment, an assigned service address (e.g., the service address 116 of FIG. 1, the service address 222 of FIG. 2, or the service address 328 of FIG. 3) is stored at the system memory 830.

The computing device 810 also contains one or more communications connections. For example, an internal network interface card (NIC) 880 allows the computing device 810 to communicate with one or more services 890 of a private network 812, such as one or more client computing systems or other servers, over a first wired or a wireless network. As another example, an external NIC 816 allows the computing device 810 to communicate data 814 with one or more client computers 808, over a second wired or a wireless network 818.

The one or more communication connections are an example of communication media. By way of example, and not limitation, communication media may include wired media such as a wired network or direct-wired connection, and wireless media such as acoustic, radio frequency (RF), infrared and other wireless media. It will be appreciated, however, that not all of the components or devices illustrated in FIG. 8 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
   assigning a service address to a service provided by a server of a private network that is accessible, via a gateway, to a client computer;
   receiving communications from the client computer at the gateway over a public network using a public network address;
   receiving communications from the server at the gateway over a private network using a private network address;
   wherein each of the public network address, the service address, and the private network address are different from each other;
   wherein the service provided by the server to the client computer is independent of a location of the client computer; and
   turning off duplicate address detection for the service address at the gateway.

2. The method of claim 1, further comprising:
   receiving a request from the client computer to access the service of the private network at the gateway, wherein the request is directed to the service address; and
   routing the request, based on the service address provided by the request from the client computer, the service address including one of an IPv4 address or an IPv6 address, from the gateway to the private network.

3. The method of claim 2, wherein the service address includes an Internet Protocol version six (IPv6) address assigned to an external network interface card (NIC) of the gateway, and wherein the request from the client computer is directed to the IPv6 address assigned to the external NIC of the gateway.

4. The method of claim 1, wherein the private network includes a corporate network, and wherein the service includes one of an Internet Protocol Security (IPSec) tunnel mode service and a forward proxy service.

5. The method of claim 1, wherein the service address represents a phantom internet protocol (IP) interface on the gateway and wherein the phantom IP interface on the gateway enables the client computer to communicate with the server via the private network while refraining from using a second gateway.

6. The method of claim 5, wherein the service of the private network is accessible by the client computer via a second gateway, and wherein the method further comprises turning off duplicate address detection at the second gateway, wherein the second gateway has a second public network address that is different from the service address, the public address, and the private network address, wherein the service address represents a phantom internet protocol (IP) interface on the second gateway, and wherein the phantom IP interface on the second gateway enables the client computer to communicate with the server via the private network while refraining from using the gateway.

7. The method of claim 6, further comprising:
receiving a request to access the service of the private network at the second gateway, wherein the request is directed to the service address; and
routing the request, based on the service address provided by the request from the client computer, the service address including an IPv4 address or an IPv6 address, from the second gateway to the private network.

8. The method of claim 7, wherein the client computer accesses the service of the private network via the gateway from a first location and accesses the service of the private network via the second gateway when the client computer is located at a second location.

9. The method of claim 1, wherein the client computer communicates with the gateway using an Internet Protocol version six (IPv6) transition technology protocol.

10. An apparatus comprising:
a processor;
a memory storing instruction executable by the processor to perform operations at a gateway comprising:
assigning a service address to a service provided by a server of a private network that is accessible via the gateway by a client computer;
receiving communications from the client computer over a public network using a public network address;
receiving communications from the server over a private network using a private network address;
turning off duplicate address detection based on the service address at the gateway; and
wherein the public network address, the service address, and the private network address are distinct addresses.

11. The apparatus of claim 10, further comprising:
responding to a request received from the client computer to access the service, wherein the request is directed to the service address; and
routing the request based on the service address provided by the request from the client computer, the service address including an IPv4 address or an IPv6 address, from the gateway to the private network.

12. The apparatus of claim 10, wherein the service address represents a phantom Internet protocol (IP) interface on the gateway, and wherein the phantom IP interface on the gateway enables the client computer to communicate with the server via the private network while refraining from using a second gateway.

13. The apparatus of claim 10, wherein the client computer communicates with the gateway using an Internet Protocol version four (IPv4) protocol, and wherein the service address is assigned to a virtual network interface card (NIC) of the gateway.

14. The apparatus of claim 10, wherein the client computer communicates with the gateway using an Internet Protocol version four (IPv4) protocol, and wherein a virtual private network (VPN) connection is established between the client computer and the gateway.

15. A method, comprising:
accessing a service provided by a server at a first time via a first gateway, the first gateway associated with a first Internet Protocol (IP) address, and using a second IP address as a service address at the first gateway, wherein the first gateway communicates with the server using a third IP address via a private network, and wherein duplicate address detection is turned off at the first gateway;
accessing the service at a second time via a second gateway, the second gateway associated with a fourth IP address, wherein the second gateway uses the second IP address as the service address, wherein the second gateway communicates with the server using the third IP address via the private network, and wherein duplicate address detection is turned off at the second gateway; and
wherein the first IP address, the second IP address, the third IP address, and the fourth IP address are distinct IP addresses, wherein the service is accessible via a portable computing device, and wherein the service provided to the portable computing device is independent of a location of the portable computing device.

16. The method of claim 15, wherein the service is accessed via the portable computer using the service address without modifying service configuration information at the portable computer between the first time and the second time.

17. The method of claim 15, wherein the service address includes an Internet Protocol Security (IPSec) IP address, and wherein the portable computer is configured to access the service of a private network via the IPSec IP address.

18. The method of claim 15, wherein the service address includes an Internet Protocol version six (IPv6) address, and wherein the IPv6 address is assigned to a first external network interface card (NIC) of the first gateway and to a second external NIC of the second gateway.

19. The method of claim 15, further comprising:
accessing the service at a third time via a third gateway, the third gateway associated with a fifth IP address, wherein duplicate address detection is turned off at the third gateway; and
wherein the service is accessed at the third gateway and via the private network using the second IP address, wherein the second IP address is different from the fifth IP address.

20. The method of claim 19, wherein the service address represents a phantom internet protocol (IP) interface on the first gateway, wherein the phantom IP interface on the first gateway enables the portable computing device to communicate with the server via the private network while refraining from using either of the second gateway or the third gateway, wherein the service address represents a phantom internet protocol (IP) interface on the second gateway, wherein the phantom IP interface on the second gateway enables the portable computing device to communicate with the server via the private network while refraining from using either of the first gateway or the third gateway, wherein the service address represents a phantom internet protocol (IP) interface on the third gateway and wherein the phantom IP interface on the third gateway enables the portable computing device to communicate with the server via the private network while refraining from using either of the first gateway or the second gateway.

* * * * *